United States Patent
Bao et al.

(10) Patent No.: US 12,069,503 B2
(45) Date of Patent: Aug. 20, 2024

(54) WIRELESS COMMUNICATION METHOD AND DEVICE

(71) Applicant: VIVO MOBILE COMMUNICATION CO., LTD., Guangdong (CN)

(72) Inventors: Wei Bao, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 297 days.

(21) Appl. No.: 17/377,771

(22) Filed: Jul. 16, 2021

(65) Prior Publication Data

US 2021/0345155 A1  Nov. 4, 2021

Related U.S. Application Data

(63) Continuation of application No. PCT/CN2020/072693, filed on Jan. 17, 2020.

(30) Foreign Application Priority Data

Jan. 18, 2019  (CN) ........................ 201910106020.X

(51) Int. Cl.
| | |
|---|---|
| *H04W 76/15* | (2018.01) |
| *H04W 8/24* | (2009.01) |
| *H04W 28/02* | (2009.01) |
| *H04W 72/1268* | (2023.01) |
| *H04W 84/04* | (2009.01) |
| *H04W 88/06* | (2009.01) |

(52) U.S. Cl.
CPC ......... *H04W 28/0221* (2013.01); *H04W 8/24* (2013.01); *H04W 72/1268* (2013.01); *H04W 76/15* (2018.02); *H04W 84/042* (2013.01); *H04W 88/06* (2013.01)

(58) Field of Classification Search
CPC ....... H04W 76/15; H04W 8/186; H04W 8/24; H04W 88/06; H04W 28/0221; H04W 84/042

See application file for complete search history.

(56) References Cited

U.S. PATENT DOCUMENTS

| | | | |
|---|---|---|---|
| 9,775,082 B1 * | 9/2017 | Chakraborty | ......... H04W 76/15 |
| 2012/0214548 A1 | 8/2012 | Pan et al. | |

(Continued)

FOREIGN PATENT DOCUMENTS

| | | |
|---|---|---|
| CN | 103974324 A | 8/2014 |
| CN | 107529155 A | 12/2017 |

(Continued)

OTHER PUBLICATIONS

Huawei et al., "UE capabilities reporting", 3GPP TSG-RAN WG2#93bis Meeting, R2-162312, Dubrovnik, Croatia, Apr. 11-15, 2016.

*Primary Examiner* — Gary Mui
(74) *Attorney, Agent, or Firm* — Price Heneveld, LLP

(57) ABSTRACT

Embodiments of the present disclosure provide a wireless communication method and a device. The method is executed by a terminal device. The terminal device is equipped with a plurality of smart cards. The method includes: sending a message, where the message is used to indicate that a plurality of UEs have an association relationship. The embodiments of the present disclosure further provide a wireless communication method and a device.

18 Claims, 2 Drawing Sheets

100

Send a message, where the message is used to indicate that a plurality of UEs have an association relationship  ~ S102

(56) References Cited

U.S. PATENT DOCUMENTS

| | | | |
|---|---|---|---|
| 2014/0220992 A1 | 8/2014 | Henneberg Rysgaard et al. | |
| 2015/0237497 A1 | 8/2015 | Chen et al. | |
| 2016/0219648 A1 | 7/2016 | Awoniyi-Oteri et al. | |
| 2016/0373948 A1* | 12/2016 | Sanka | H04W 36/0085 |
| 2017/0367085 A1 | 12/2017 | Chakraborty | |
| 2018/0146365 A1* | 5/2018 | Dhanapal | H04W 8/183 |
| 2020/0029321 A1 | 1/2020 | Zhang et al. | |
| 2020/0236603 A1* | 7/2020 | Cuevas Ramirez | H04W 36/14 |
| 2020/0413324 A1* | 12/2020 | Jiang | H04W 8/183 |
| 2021/0282103 A1* | 9/2021 | Zhu | H04W 76/15 |
| 2021/0345097 A1* | 11/2021 | Wu | H04W 76/15 |
| 2021/0345292 A1* | 11/2021 | Bao | H04W 28/0268 |

FOREIGN PATENT DOCUMENTS

| | | | |
|---|---|---|---|
| CN | 107889098 A | 4/2018 | |
| CN | 108650672 A | 10/2018 | |
| EP | 3002986 A2 | 4/2016 | |
| EP | 3913948 A1 | 11/2021 | |
| WO | 2016118248 A1 | 7/2016 | |
| WO | 2016118249 A1 | 7/2016 | |
| WO | 2018059472 A1 | 4/2018 | |
| WO | 2018141148 A1 | 8/2018 | |

* cited by examiner

100
```
Send a message, where the message is used to indicate that a
plurality of UEs have an association relationship          ∼ S102
```
FIG. 1
200
```
Receive a message, where the message is from a terminal device,
the terminal device is equipped with a plurality of smart cards, and
the message is used to indicate that a plurality of UEs have an      ∼ S202
association relationship
```
FIG. 2
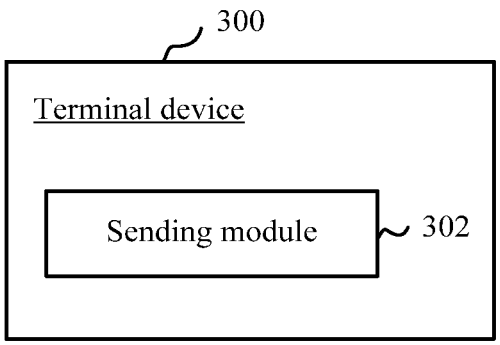
FIG. 3
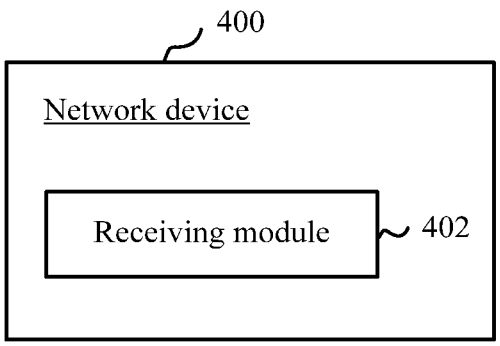
FIG. 4

WIRELESS COMMUNICATION METHOD AND DEVICE

CROSS REFERENCE TO RELATED APPLICATIONS

This application is a continuation of PCT Application No. PCT/CN2020/072693 filed on Jan. 17, 2020, which claims priority to Chinese Patent Application No. 201910106020.X filed in China on Jan. 18, 2019, which is incorporated herein by reference in its entirety.

TECHNICAL FIELD

Embodiments of this application relate to the field of communications technologies, and in particular, to a wireless communication method and a device.

BACKGROUND

With the development of terminal device technologies, one terminal can be equipped with one or more smart cards (or subscriber identity module SIM cards). In the related art, for a terminal device equipped with a plurality of (for example, two) smart cards, if the smart cards communicate with a network device at the same time, the smart cards share capabilities (such as a buffer size, the maximum uplink power, and the like) of the terminal device, but the sum of transmission rates scheduled by the network device for the smart cards may be greater than the maximum transmission rate of the terminal device, problems such as data loss may be caused.

SUMMARY

Embodiments of this application aim to provide a wireless communication method and a device, to resolve a problem that data loss of a terminal device is caused due to reasons such as that a network device dispatches the terminal device when it is uncertain about a quantity of smart cards that the terminal device is equipped with.

According to a first aspect, a wireless communication method is provided, where the method is executed by a terminal device, the terminal device is equipped with a plurality of smart cards, and the method includes: sending a message, where the message is used to indicate that a plurality of UEs have an association relationship.

According to a second aspect, a wireless communication method is provided, where the method is executed by a network device, and includes: receiving a message, where the message is from a terminal device, the terminal device is equipped with a plurality of smart cards, and the message is used to indicate that a plurality of UEs have an association relationship.

According to a third aspect, a terminal device is provided, where the terminal device is equipped with a plurality of smart cards and includes: a sending module, configured to send a message, where the message is used to indicate that a plurality of UEs have an association relationship.

According to a fourth aspect, a network device is provided, where the network device includes: a receiving module, configured to receive a message, where the message is from a terminal device, the terminal device is equipped with a plurality of smart cards, and the message is used to indicate that a plurality of UEs have an association relationship.

According to a fifth aspect, a terminal device is provided, where the terminal device includes: a processor, a memory, and a computer program that is stored in the memory and that can run on the processor, and when the computer program is executed by the processor, the steps of the wireless communication method provided in the first aspect are implemented.

According to a sixth aspect, a network device is provided, where the network device includes: a processor, a memory, and a computer program that is stored in the memory and that can run on the processor, and when the computer program is executed by the processor, the steps of the wireless communication method provided in the second aspect are implemented.

According to a seventh aspect, a computer-readable storage medium is provided, where the computer-readable storage medium stores a computer program, and when the computer program is executed by a processor, the steps of the wireless communication method provided in the first aspect and the second aspect are implemented.

According to the embodiments of the present disclosure, the terminal device equipped with the smart cards can send a message to the network device, and the message can be used to indicate that the UEs have an association relationship. In this way, the network device can subsequently take the maximum sending power of the terminal device into consideration based on a capability of the terminal device when performing uplink scheduling for the UEs, so that the sum of transmission rates of the UEs is smaller than or equal to the maximum transmission rate of the terminal device, thereby avoiding problems such as data loss.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings:

FIG. 1 is a schematic flowchart of a wireless communication method according to an embodiment of the present disclosure;

FIG. 2 is a schematic flowchart of a wireless communication method according to another embodiment of the present disclosure;

FIG. 3 is a schematic structural diagram of a terminal device according to an embodiment of the present disclosure;

FIG. 4 is a schematic structural diagram of a network device according to an embodiment of the present disclosure;

DESCRIPTION OF EMBODIMENTS

Figure 5:
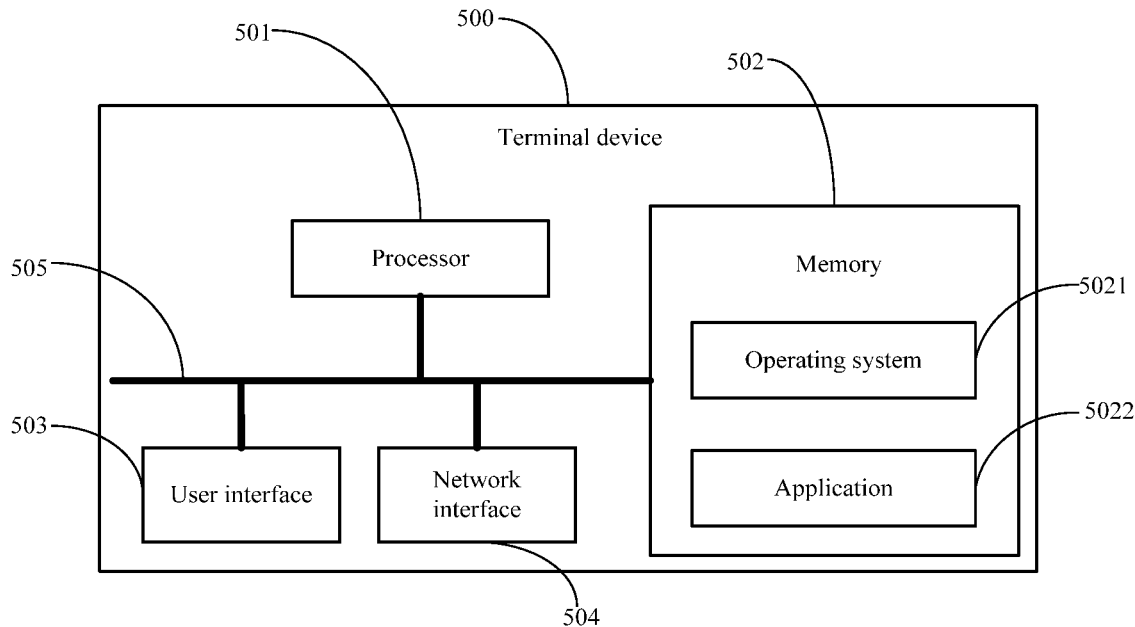
FIG. 5 is a schematic structural diagram of a terminal device according to another embodiment of the present disclosure.

To make the objectives, technical solutions, and advantages of this application clearer, the following clearly and completely describes the technical solutions of this application with reference to specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application.

It should be understood that, the technical solutions of the embodiments of the present disclosure may be applied to various communications systems, for example: a global system for mobile communications (GSM), a code division multiple address (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a Worldwide Interoperability for Microwave Access (WiMAX) communications system, a 5G system, a new radio (NR) system, or a subsequent evolved communications system.

In the embodiments of the present disclosure, a terminal device may include but is not limited to a mobile station (MS), a mobile terminal, a mobile telephone, a user equipment (UE), a handset, a portable device (portable equipment), a vehicle, and the like. The terminal device may communicate with one or more core networks by using a radio access network (RAN). For example, the terminal device may be a mobile phone (or referred to as a "cellular" phone), or a computer having a wireless communication function; or the terminal device may be a portable, pocket-sized, handheld, computer built-in, or in-vehicle mobile apparatus.

In the embodiments of the present disclosure, a network device is an apparatus that is deployed in a radio access network and that is used to provide a wireless communication function for a terminal device. The network device may be a base station, and the base station may include various types of macro base stations, micro base stations, relay nodes, and access points. In systems using different radio access technologies, names of devices having a base station function may be different. For example, such a device is called an evolved NodeB (evolved NodeB, eNB or eNodeB) in an LTE network, a Node B in a 3rd generation (3G) network, or a network device in a subsequent evolved communications system (for example, a next generation base station (next generation node base station, gNB)), but the use of the words does not constitute a restriction.

As shown in FIG. 1, an embodiment of the present disclosure provides a wireless communication method 100. The method can be executed by a terminal device, and the terminal device can be equipped with a plurality of smart cards simultaneously, for example, two, three, or more. The method includes the following step:

S102: Send a message, where the message is used to indicate that a plurality of UEs have an association relationship.

The terminal device in the embodiments of this specification may refer to a physical terminal device equipped with a plurality of smart cards.

The UE provided in the embodiments of this specification may refer to functions of communication transmitting-receiving protocols corresponding to a smart card, for example, protocol stacks including Non-Access Stratum (NAS), Radio Resource Control (RRC), Packet Data Convergence Protocol (PDCP), and Radio Link Control (RLC). Each UE can independently receive a dispatching, configuration, or power control command from a network device, and receive and send data under the control of the network device. That is, the UE may be a protocol entity corresponding to a smart card in the terminal device plus the smart card.

In a specific example, the smart cards that the terminal device is equipped with have a one-to-one correspondence with the UEs in this step.

Therefore, it may be understood that one terminal device may be a physical carrier of a plurality of logical UE functions, and each logical UE function corresponds to one smart card. In the embodiments of this specification, the logical UE function is also referred to as a UE corresponding to a smart card.

The smart card in the embodiments of this specification may also be referred to as a SIM card, or the like. In addition, the smart card in the embodiments of this specification may be an entity card, or may be a virtual card, for example, an embedded-SIM (eSIM) card.

In this step, the terminal device can send the message via at least one of the UEs. If at least two UEs each send a message, functions of the messages sent by the at least two UEs may be the same, for example, may be used to indicate that the UEs corresponding to the smart cards that the terminal device is equipped with have an association relationship, or may be used to indicate that the UEs share a capability of the terminal device.

Optionally, the message is specifically used to indicate that the UEs share a capability of the terminal device. In this way, after receiving the message, the network device learns that the UEs have an association relationship, that is, the network device learns that the terminal device is equipped with the smart cards. Therefore, the network device subsequently takes the maximum sending power of the terminal device into consideration based on the capability of the terminal device when performing uplink scheduling for the UEs, so that the sum of transmission rates of the UEs is smaller than or equal to the maximum transmission rate of the terminal device, avoiding problems such as data loss.

Before this embodiment of the present disclosure is implemented, the terminal device may report capability information via at least one of the UEs. The reported capability includes but is not limited to the following: the maximum data rate (max data rate) supported by the terminal device, which can be obtained by the network device through calculation based on a supported band or supported band combinations (band combinations) that are reported; and an uplink transmit power supported by the terminal device, which can be obtained by the network device based on reported UE power class (ue-PowerClass).

For ease of differentiation, the UE that sends the message in this embodiment may be referred to as a first UE. A UE other than the first UE of the terminal device is referred to as a second UE. That is, the second UE does not send messages. In a specific example, there is one first UE, and one or more second UEs. In another specific example, there are a plurality of first UEs. To improve transmission reliability of first messages, the first UEs each send a first message. There may be one or more, or zero second UEs.

Optionally, the message may include an identifier of the second UE, for example, a cell radio network temporary identifier (C-RNTI) allocated by a serving cell for the second UE, an international mobile subscriber identity (IMSI) of the second UE, or a temporary mobile subscriber identity (System Architecture Evolution Temporary Mobile Subscriber Identity, SAE-Temporary Mobile Subscriber Identity, S-TMSI) of the second UE obtained by a second UE NAS entity from the network side.

Optionally, after the sending a message, the method may further include the following step: receiving a response message, where the response message is used to indicate whether the message is successfully received. In this way, when the network device fails to receive the message, the terminal device can perform operations such as a message retransmission.

According to the wireless communication method provided in this embodiment of the present disclosure, the terminal device equipped with the smart cards can send the message to the network device, and the message can be used to indicate that the UEs have an association relationship. In this way, the network device subsequently takes the maximum sending power of the terminal device into consideration based on the capability of the terminal device when performing uplink scheduling for the UEs, so that the sum of transmission rates of the UEs is smaller than or equal to the maximum transmission rate of the terminal device, avoiding problems such as data loss.

Based on the embodiment shown in FIG. 1, optionally, the sending a message in step S102 includes: sending the message when at least two of the UEs are in an RRC connected state. In this embodiment, each smart card of the terminal device may correspond to a UE.

In the foregoing embodiments, the sending a message in step S102 includes: sending the message via at least one of the UEs. Functions of messages sent by the UEs may be the same, to improve message transmission reliability.

In the foregoing embodiments, public land mobile networks (PLMN) to which the terminal device is connected via the UEs are the same. In this way, when network devices to which the UEs are connected are different, the network devices directly perform communication and coordination, and further dispatch different UEs of the terminal device. Certainly, in a special case, when PLMNs to which the UEs are connected are different, different operators can coordinate to dispatch different UEs of the terminal device.

That PLMNs to Which the UEs are Connected are the Same May Specifically be:

There is at least one same registered PLMN or equivalent PLMN for the UEs. For example, registered PLMNs and equivalent PLMNs of the UEs are all the same. Alternatively, there is one same registered PLMN or equivalent PLMN for the UEs.

The message in the foregoing embodiments may specifically include at least one of the following: an identifier of a second UE;
an identifier of a second cell;
an identifier of a first UE; and
an identifier of a first cell, where
the first UE is a UE that sends the message, the second UE is a UE other than the first UE, the first cell is a cell to which the terminal device is connected via the first UE, and the second cell is a cell to which the terminal device is connected via the second UE.

Considering that the message is sent by the first UE, the network device can learn the identifier of the first UE and the identifier of the first cell. Preferably, to reduce signaling overheads, the message includes the identifier of the second UE. Alternatively, when a cell to which the terminal device is connected via the first UE and a cell to which the terminal device is connected via the second UE are different, the message includes the identifier of the second UE and the identifier of the second cell.

The identifier of the UE mentioned above may specifically be a C-RNTI, an IMSI, an S-TMSI, or the like.

Optionally, cells to which the terminal device is connected via the UEs are the same; or cells to which the terminal device is connected via the UEs are different.

The following describes the wireless communication method provided in this embodiment of the present disclosure in detail with reference to a specific embodiment. In the embodiment, the first UE and the second UE are connected to a same serving cell, a UE ID (for example, a C-RNTI, an IMSI, an S-TMSI, or the like) of the first UE is A, and a UE ID of the second UE is B.

The first UE reports, to the network device, that the first UE and another UE that is in an RRC connected state share the capability of the terminal device and the ID of the second UE is B. Certainly, if the terminal device has a plurality of second UEs, UE IDs of the second UEs can be reported at a time.

Alternatively, the terminal device has two UEs (first UE and second UE) that are in a connected state and that share a capability of the terminal device, and UE IDs of the two UEs are A and B, respectively.

After receiving the reported information, the network device leans that the first UE and the second UE share the capability of the terminal device, and based on this, performs subsequent operations such as dispatching and power control on the two UEs.

In another embodiment (second embodiment), serving cells to which the first UE and the second UE are connected are different: the first UE is connected to a cell X, and a UE ID (for example, a C-RNTI, an IMSI, an S-TMSI, or the like) of the first UE is A; and the second UE is connected to a cell Y, and a UE ID of the second UE is B.

The first UE reports, to the network device, that the first UE and another UE that is in an RRC connected state (the second UE) share a capability of the terminal device, the second UE is connected to the cell Y, and the UE ID of the second UE is B.

Alternatively, the terminal device has two UEs (a first UE and a second UE) that are in a connected state and that share a capability of the terminal device, cell IDs of the two UEs are X and Y, respectively; and UE IDs of the two UEs are A and B, respectively.

After receiving the reported information, the network device leans that the first UE and the second UE share the capability of the terminal device, and based on this, performs subsequent operations such as dispatching and power control on the two UEs. Optionally, when the cell X and the cell Y do not belong to a same network device, network devices need to perform coordination.

The foregoing describes the wireless communication method according to this embodiment of the present disclosure in detail with reference to FIG. 1. A wireless communication method according to another embodiment of the present disclosure will be described in detail below with reference to FIG. 2. It may be understood that the interaction between the network device and the terminal device described on the network device side is the same as that described on the terminal device side in the method shown in FIG. 1. To avoid repetition, relevant descriptions are appropriately omitted.

FIG. 2 is a schematic flowchart of an implementation of a wireless communication method according to an embodiment of the present disclosure, where the method can be applied to the network device side. As shown in FIG. 2, the method 200 includes the following step:

S202: Receive a message.

The message is from a terminal device, the terminal device is equipped with a plurality of smart cards, and the message is used to indicate that a plurality of UEs have an association relationship.

According to the wireless communication method provided in this embodiment of the present disclosure, the terminal device equipped with the smart cards can send the message to the network device, and the message is used to indicate that the UEs have an association relationship. In this way, the network device subsequently takes the maximum sending power of the terminal device into consideration when performing uplink scheduling for the UEs based on the capability of the terminal device, so that the sum of transmission rates of the UEs is smaller than or equal to the maximum transmission rate of the terminal device, avoiding problems such as data loss.

Optionally, as an embodiment, at least two of the UEs are in an RRC connected state at a moment when the terminal device sends the message.

Optionally, as an embodiment, the message is sent by at least one of the UEs.

Optionally, as an embodiment, PLMNs to which the terminal device is connected via the UEs are the same.

Optionally, as an embodiment, cells to which the terminal device is connected via the UEs are the same; or cells to which the terminal device is connected via the UEs are different.

Optionally, as an embodiment, the message includes at least one of the following:
an identifier of a second UE;
an identifier of a second cell;
an identifier of a first UE; and
an identifier of a first cell, where
the first UE is a UE that sends the message, the second UE is a UE other than the first UE, the first cell is a cell to which the terminal device is connected via the first UE, and the second cell is a cell to which the terminal device is connected via the second UE.

Optionally, as an embodiment, the message is specifically used to indicate that the UEs share a capability of the terminal device.

Optionally, as an embodiment, after the receiving a message, the method further includes:
sending a response message, where the response message is used to indicate whether the message is successfully received.

Optionally, as an embodiment, after the receiving a message, the method further includes:
dispatching the UEs for data transmission, where the sum of data rates of the UEs is not greater than the maximum data rate of the terminal device.

According to this embodiment, a case in which a transmission rate of the terminal device exceeds a limit can be avoided, so as to avoid data loss of the terminal device and improve transmission validity.

Optionally, as an embodiment, after the receiving a message, the method further includes:
dispatching the UEs for data transmission, where the sum of powers of the UEs is not greater than the maximum power of the terminal device.

According to this embodiment, a case in which a transmission power of the terminal device exceeds a limit can be avoided, so as to avoid power back-off of the terminal device and improve transmission validity.

Optionally, as an embodiment, after the receiving a message, the method further includes:
instructing the UEs to perform discontinuous reception (DRX) configuration, where sleep periods of the UEs overlap.

Preferably, sleep periods of the UEs may completely overlap. In this way, duration of the sleep period of the terminal device can be increased, saving electrical energy of the terminal device.

Optionally, as an embodiment, after the receiving a message, the method further includes:
instructing the UEs to perform GAP configuration, where GAP periods of the UEs do not overlap; or
GAP widths (TGAPs) of the UEs do not overlap.

According to this embodiment, a case in which GAP measurement of different UEs of the terminal device conflicts can be avoided, improving communication effectiveness.

The foregoing describes the wireless communication method according to this embodiment of the present disclosure in detail with reference to FIG. 1 and FIG. 2. A terminal device according to an embodiment of the present disclosure will be described in detail below with reference to FIG. 3.

FIG. 3 is a schematic structural diagram of a terminal device according to an embodiment of the present disclosure, where the terminal device is equipped with a plurality of smart cards. As shown in FIG. 3, the terminal device 300 further includes:
a sending module 302, configured to send a message, where the message is used to indicate that a plurality of UEs have an association relationship.

According to the terminal device provided in this embodiment of the present disclosure, the terminal device equipped with the smart cards can send the message to a network device, and the message can be used to indicate that the UEs have an association relationship. In this way, the network device can subsequently take the maximum sending power of the terminal device into consideration when performing uplink scheduling for the UEs based on a capability of the terminal device, so that the sum of transmission rates of the UEs is smaller than or equal to the maximum transmission rate of the terminal device, avoiding problems such as data loss.

Optionally, as an embodiment, the sending module 302 sends a message includes: the sending module 302 sends the message when at least two of the UEs are in an RRC connected state.

Optionally, as an embodiment, the sending module 302 sends a message includes: the sending module 302 sends the message via at least one of the UEs.

Optionally, as an embodiment, PLMNs to which the terminal device 300 is connected via the UEs are the same.

Optionally, as an embodiment, cells to which the terminal device 300 is connected via the UEs are the same; or
cells to which the terminal device 300 is connected via the UEs are different.

Optionally, as an embodiment, the message includes at least one of the following:
an identifier of a second UE;
an identifier of a second cell;
an identifier of a first UE; and
an identifier of a first cell, where
the first UE is a UE that sends the message, the second UE is a UE other than the first UE, the first cell is a cell to which the terminal device is connected via the first UE, and the second cell is a cell to which the terminal device is connected via the second UE.

Optionally, as an embodiment, the message is specifically used to indicate that the UEs share a capability of the terminal device.

Optionally, as an embodiment, the terminal device 300 further includes a receiving module (not shown in the figure), configured to receive a response message, where the response message is used to indicate whether the message is successfully received.

For the terminal device 300 according to this embodiment of the present disclosure, reference may be made to the corresponding procedure of the method 100 according to an embodiment of the present disclosure, and each unit/module in and the foregoing other operations and/or functions of the terminal device 300 are used to implement the corresponding procedure of the method 100, and will no longer be described here for the purpose of brevity.

FIG. 4 is a schematic structural diagram of a network device according to an embodiment of the present disclosure. As shown in FIG. 4, the network device 400 includes:

a receiving module 402, configured to receive a message, where the message is from a terminal device, the terminal device is equipped with a plurality of smart cards, and the message is used to indicate that a plurality of UEs have an association relationship.

According to the network device provided in this embodiment of the present disclosure, the terminal device equipped with the smart cards can send a message to the network device, and the message can be used to indicate that the UEs have an association relationship. In this way, the network device subsequently takes the maximum sending power of the terminal device into consideration when performing uplink scheduling for the UEs based on a capability of the terminal device, so that the sum of transmission rates of the UEs is smaller than or equal to the maximum transmission rate of the terminal device, avoiding problems such as data loss.

Optionally, as an embodiment, at least two of the UEs are in an RRC connected state at a moment when the terminal device sends the message.

Optionally, as an embodiment, the message is sent by at least one of the UEs.

Optionally, as an embodiment, PLMNs to which the terminal device is connected via the UEs are the same.

Optionally, as an embodiment, cells to which the terminal device is connected via the UEs are the same; or cells to which the terminal device is connected via the UEs are different.

Optionally, as an embodiment, the message includes at least one of the following:

an identifier of a second UE;
an identifier of a second cell;
an identifier of a first UE; and
an identifier of a first cell, where
the first UE is a UE that sends the message, the second UE is a UE other than the first UE, the first cell is a cell to which the terminal device is connected via the first UE, and the second cell is a cell to which the terminal device is connected via the second UE.

Optionally, as an embodiment, the message is specifically used to indicate that the UEs share a capability of the terminal device.

Optionally, as an embodiment, the network device 400 further includes: a sending module (not shown in the figure), configured to send a response message, where the response message is used to indicate whether the message is successfully received.

Optionally, as an embodiment, the network device 400 further includes: a dispatching module (not shown in the figure), configured to dispatch the UEs for data transmission, where the sum of data rates of the UEs is not greater than the maximum data rate of the terminal device.

According to this embodiment, a case in which a transmission rate of the terminal device exceeds a limit can be avoided, so as to avoid data loss of the terminal device and improve transmission validity.

Optionally, as an embodiment, the network device 400 further includes: a dispatching module (not shown in the figure), configured to dispatch the UEs for data transmission, where the sum of powers of the UEs is not greater than the maximum power of the terminal device.

Optionally, as an embodiment, the network device 400 further includes: an instruction module (not shown in the figure), configured to:

instruct the UEs to perform DRX configuration, where sleep periods of the UEs overlap.

Optionally, as an embodiment, the network device 400 further includes: an instruction module (not shown in the figure), configured to:

instruct the UEs to perform GAP configuration, where GAP periods of the UEs do not overlap; or GAP widths (TGAPs) of the UEs do not overlap.

For the network device 400 according to this embodiment of the present disclosure, reference may be made to the corresponding procedure of the method 200 according to the embodiment of the present disclosure, and each unit/module in and the foregoing other operations and/or functions of the network device 400 are used to implement the corresponding procedure of the method 200, and will no longer be described here for the purpose of brevity.

FIG. 5 is a block diagram of a terminal device according to another embodiment of the present disclosure. The terminal device 500 shown in FIG. 5 includes at least one processor 501, a memory 502, at least one network interface 504, and a user interface 503. The components in the terminal device 500 are coupled together through a bus system 505. It may be understood that the bus system 505 is configured to implement connection and communication between these components. In addition to a data bus, the bus system 505 further includes a power bus, a control bus, and a status signal bus. However, for clarity of description, various buses are marked as the bus system 505 in FIG. 5.

The user interface 503 may include a display, a keyboard, or a clicking device, for example, a mouse, a trackball, a touch panel, or a touchscreen.

It may be understood that the memory 502 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAIVI), and a direct rambus random access memory (DRRAM). The memory 502 of the system and the method described in the embodiments of the present disclosure is intended to include, but is not limited to, these and any other suitable types of memories.

In some implementations, the memory 502 stores the following elements: executable modules or data structures, a subset thereof, or an extended set thereof: an operating system 5021 and an application 5022.

The operating system 5021 includes various system programs, for example, a framework layer, a kernel library layer, and a driver layer, and is configured to implement various basic services and process hardware-based tasks. The application 5022 includes various applications, for example, a media player and a browser, and is configured to implement various application services. A program for implementing the method in the embodiments of the present disclosure may be included in the application 5022.

In this embodiment of the present disclosure, the terminal device 500 further includes a computer program that is stored in the memory 502 and that can run on the processor 501, and when the computer program is executed by the processor 501, the steps of the method 100 are implemented.

The method disclosed in the foregoing embodiment of the present disclosure may be applied to the processor 501 or implemented by the processor 501. The processor 501 may be an integrated circuit chip having a signal processing capability. During implementation, the steps of the foregoing method may be completed by hardware integrated logic circuits in the processor 501 or instructions in a form of software. The above processor 501 may be a general-purpose processor, a digital signal processor (DSP), an application specific integrated circuit (ASIC), a field programmable gate array (FPGA) or other programmable logic devices, a discrete gate or transistor logic device, and a discrete hardware component. The processor 501 may implement or perform the methods, the steps, and logical block diagrams that are disclosed in the embodiments of the present disclosure. The general-purpose processor may be a microprocessor or may be any conventional processor or the like. The steps of the method disclosed in the embodiments of the present disclosure may be directly executed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 502, and the processor 501 reads information from the memory 502 and completes the steps of the foregoing method in combination with hardware of the processor 501. Specifically, the computer readable storage medium stores a computer program, and when the computer program is executed by the processor 501, the steps of the foregoing embodiment of method 100 are implemented.

It can be understood that those embodiments described in the embodiments of the present disclosure can be implemented with hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation with software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

The terminal device 500 can implement each process implemented by the terminal device in the foregoing embodiments. To avoid repetition, details are not described herein again.

Figure 6:
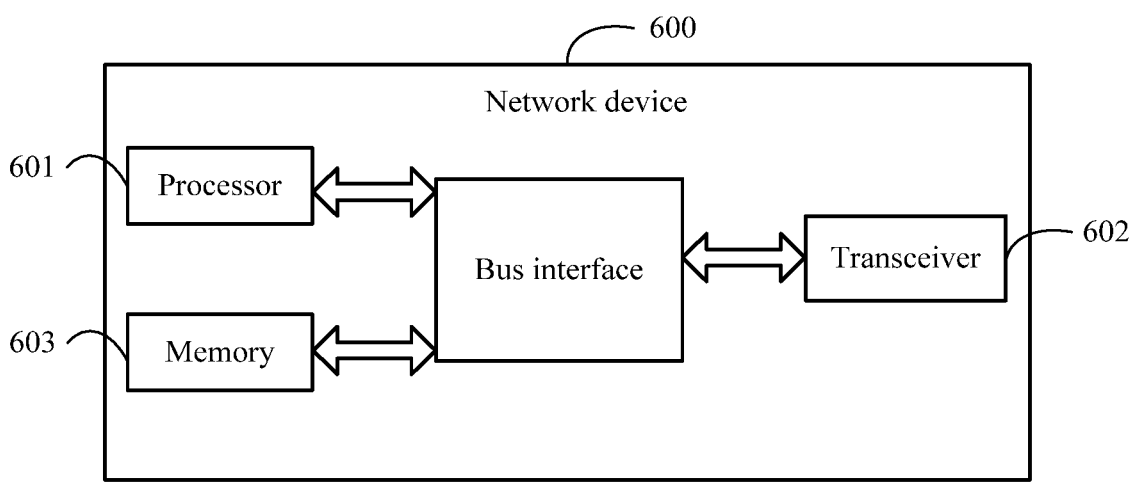
FIG. 6 is a schematic structural diagram of a network device according to another embodiment of the present disclosure.

Referring to FIG. 6, FIG. 6 is a structural diagram of a network device to which an embodiment of the present disclosure is applied. The network device can implement details of the embodiment of the method 200, and achieve a same effect. As shown in FIG. 6, a network device 600 includes a processor 601, a transceiver 602, a memory 603, and a bus interface.

In this embodiment of the present disclosure, the network device 600 further includes: a computer program stored in the memory 603 and executable on the processor 601. When the computer program is executed by the processor 601, the steps of the method 200 are implemented.

In FIG. 6, a bus architecture may include any quantity of interconnected buses and bridges, which are specifically connected together by various circuits of one or more processors represented by the processor 601 and a memory represented by the memory 603. The bus architecture may further link various other circuits such as a peripheral device, a voltage regulator, and a power management circuit. These are well known in the art, and therefore are not further described in this specification. The bus interface provides an interface. The transceiver 602 may be a plurality of components. To be specific, the transceiver 602 includes a transmitter and a receiver, and provides a unit configured to communicate with various other apparatuses on a transmission medium.

The processor 601 is responsible for bus architecture management and general processing. The memory 603 may store data used by the processor 601 when the processor 601 performs an operation.

The embodiments of the present disclosure further provide a computer-readable storage medium. The computer-readable storage medium stores a computer program, and when a processor executes the computer program, the processes of the embodiments of the foregoing methods 100 and 200 are implemented and the same technical effect can be achieved. To avoid repetition, details are not described herein again. The computer readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of the present invention essentially or the part contributing to existing technologies may be implemented in a form of a software product. The computer software product is stored in a storage medium (for example, a ROM/RAM, a magnetic disk, or an optical disc) and includes several instructions for instructing a terminal (which may be a mobile phone, a computer, a server, an air conditioner, or a network device) to execute the methods described in the embodiments of the present invention.

The embodiments of the present invention are described with reference to the accompanying drawings. However, the present invention is not limited to the foregoing specific implementations. The foregoing specific implementations are merely examples, but are not limiting. A person of ordinary skill in the art may make many forms without departing from the objective and the scope of the claims of the present invention, and these forms all fall within the protection scope of the present invention.

The invention claimed is:

1. A wireless communication method, wherein the method is executed by a terminal device, the terminal device is equipped with a plurality of smart cards, and the method comprises:
sending a message, wherein the message is used to indicate that a plurality of user equipments (UEs) have an association relationship,
wherein the message is specifically used to indicate that the UEs share a capability of the terminal device, wherein the capability of the terminal device comprises a max data rate supported by the terminal device and an uplink power supported by the terminal device,
wherein the message comprises an identifier of a second UE and an identifier of a second cell, and is sent by only a first UE among the plurality of UEs;
the second UE is among the plurality of UEs and is other than the first UE, and the second cell is a cell to which the terminal device is connected via the second UE.

2. The method according to claim 1, wherein the sending a message comprises:
sending the message when at least two of the UEs are in a radio resource control (RRC) connected state.

3. The method according to claim 2, wherein
public land mobile networks (PLMNs) to which the terminal device is connected via the UEs are the same.

4. The method according to claim 2, wherein
cells to which the terminal device is connected via the UEs are the same; or
cells to which the terminal device is connected via the UEs are different.

5. The method according to claim 1, wherein the sending a message comprises:
sending the message via at least one of the UEs.

6. The method according to claim 1, wherein the message further comprises at least one of the following:
an identifier of the first UE; and
an identifier of a first cell, wherein
the first cell is a cell to which the terminal device is connected via the first UE.

7. The method according to claim 1, further comprising:
receiving a response message, wherein the response message is used to indicate whether the message is successfully received.

8. A wireless communication method, wherein the method is executed by a network device, and the method comprises:
receiving a message, wherein
the message is from a terminal device, the terminal device is equipped with a plurality of smart cards, and the message is used to indicate that a plurality of UEs have an association relationship,
wherein the message is specifically used to indicate that the UEs share a capability of the terminal device, wherein the capability of the terminal device comprises a max data rate supported by the terminal device and an uplink power supported by the terminal device,
wherein the message comprises an identifier of a second UE and an identifier of a second cell, and is sent by only a first UE among the plurality of UEs;
the second UE is among the plurality of UEs and is other than the first UE, and the second cell is a cell to which the terminal device is connected via the second UE.

9. The method according to claim 8, wherein at least two of the UEs are in an RRC connected state at a moment when the terminal device sends the message.

10. The method according to claim 9, wherein PLMNs to which the terminal device is connected via the UEs are the same.

11. The method according to claim 9, wherein
cells to which the terminal device is connected via the UEs are the same; or
cells to which the terminal device is connected via the UEs are different.

12. The method according to claim 8, wherein the message is sent by at least one of the UEs.

13. The method according to claim 8, wherein the message further comprises at least one of the following:
an identifier of the first UE; and
an identifier of a first cell, wherein
the first cell is a cell to which the terminal device is connected via the first UE.

14. The method according to claim 8, further comprising:
sending a response message, wherein the response message is used to indicate whether the message is successfully received.

15. The method according to claim 8, wherein after the receiving a message, the method further comprises: dispatching the UEs for data transmission, wherein
the sum of data rates of the UEs is not greater than the maximum data rate of the terminal device.

16. The method according to claim 8, wherein after the receiving a message, the method further comprises:
dispatching the UEs for data transmission, wherein
the sum of powers of the UEs is not greater than the maximum power of the terminal device.

17. A terminal device, wherein the terminal device is equipped with a plurality of smart cards, and comprises a memory, a processor, and a computer program that is stored in the memory and that can run on the processor, when the computer program is executed by the processor, following steps are implemented:
sending a message, wherein the message is used to indicate that a plurality of UEs have an association relationship,
wherein the message is specifically used to indicate that the UEs share a capability of the terminal device, wherein the capability of the terminal device comprises a max data rate supported by the terminal device and an uplink power supported by the terminal device,
wherein the message comprises an identifier of a second UE and an identifier of a second cell, and is sent by only a first UE among the plurality of UEs;
the second UE is among the plurality of UEs and is other than the first UE, and the second cell is a cell to which the terminal device is connected via the second UE.

18. A network device, comprising a memory, a processor, and a computer program that is stored in the memory and that can run on the processor, wherein when the computer program is executed by the processor, the steps of the method according to claim 8 are implemented.

* * * * *